Patented June 24, 1924.

1,498,781

UNITED STATES PATENT OFFICE.

BENJAMIN T. BROOKS, OF BAYSIDE, NEW YORK, ASSIGNOR TO CHADELOID CHEMICAL COMPANY, A CORPORATION OF WEST VIRGINIA.

PROCESS OF TREATING PETROLEUM STILL GASES.

No Drawing.  Application filed August 21, 1919. Serial No. 318,860.

*To all whom it may concern:*

Be it known that I, BENJAMIN T. BROOKS, a citizen of the United States, and a resident of Bayside, in the county of Queens, Long Island, and State of New York, have invented certain new and useful Improvements in Processes of Treating Petroleum Still Gases, of which the following is a specification.

The present invention relates to a new and useful method of treating petroleum still gases. When crude petroleums are distilled relatively large volumes of gas are given off toward the end of the distillation, particularly in the type of stills known as coking stills. The gas referred to passes through the condensers where oil vapors are condensed and removed and then the gas passes to the open air to suitable receivers, or, as is usually the case, is burned as fuel. This gas has a peculiar and characteristic composition. It more closely resembles coal retort gas rather than the ordinary oil gas made by cracking oil in hot tubes, heated brick chambers and the like. Whereas the latter gas usually contains forty to fifty per cent of illuminants, still gas like coal gas usually contains ten per cent or less by volume of illuminants. Like coal gas, still gas, as it issues from the stills frequently contains conspicuous quantities of ammonia whereas ordinary oil gas is free from this substance. However coal gas and oil gas are both richer in aromatic hydrocarbons such as benzol, toluol, naphthalene etc., than still gas. Also the per cent of methane is markedly higher in still gas than in oil or coal retort gas. These peculiarities of still gas have necessitated the finding of new methods for its utilization in a chemical way.

It has long been known from the classic work of A. Wurtz, Louis Henry and others, that ethylene and propylene combine with hypochlorous acid in dilute aqueous solution to form the corresponding chlorhydrins. It is also fairly obvious that agitation and increased pressures will facilitate the solution of these olefines in the aqueous solution. I find however that the practice of these simple expedients is not sufficient in the case of still gas to effect economic operation, that is to say the characteristic olefine content of still gas is so small that even by the use of pressures of 100 or 150 lbs. per square inch, the absorption of the olefines is too slow for practical or useful results. I have overcome this difficulty by absorbing the olefines in a solvent having greater solvent power for the gaseous olefines than water. Thus I find that the solubility of ethylene in the gasoline fraction 100°–110° is about twelve times as great as in water at ordinary atmospheric temperature and pressure. This may advantageously be done under a gas pressure of about 75 to 150 lbs. pressure thus diminishing the loss of solvent by evaporation and accelerating the solution of the olefines. This solvent when immiscible in water as in the preferred form of my invention, also serves the important purpose of taking up in solution and thus extracting continually the chlorhydrin, or chlorhydrins from the aqueous solution. Hypochlorous acid may pass into the solvent layer to some extent and form chlorhydrins in the substantially nonaqueous phase or layer. However I do not limit myself to this explanation but note as a fact that when an immiscible solvent benzol, gasoline or kerosene, for example, is employed a large part of the chlorhydrin is found at the end of the operation in the solvent layer. This has the practical advantage that more chlorhydrin can be produced by treating the gas with the mixture of aqueous liquid and solvent than when aqueous solutions alone are employed. This is probably accounted for not only by the solvent effect of the organic solvent in removing the olefines from the gas (dilute with respect to olefines) and thus rendering them accessible to the hypochlorous acid, but also by the fact that in aqueous salt solutions the formation of chlorhydrins is very much retarded when the concentration of chlorhydrins is equal to about five or more per cent.

The following is a general description of the process. A solution of hypochlorous acid is prepared by any of the well known methods, for example the action of chlorine water on a heavy metal oxide, the action of chlorine on an aqueous solution of a carbonate, bicarbonate, borate or other weak acid salt, or the action of a weak acid such as carbonic acid or boric acid on a soluble hypochlorite. Particularly I prefer to employ solutions made by the action of chlorine on cold solutions of soda ash or solutions made by the action of carbon dioxide on a cold solution of calcium hypochlorite or commercial bleaching powder. This hypochlorous acid solution is slowly introduced by means of pressure into the top of a reaction vessel similar to a gas scrubbing tower. This reaction vessel or tower is preferably made of iron lined on the inside with lead or cement. It is provided with two inlet pipes in the top through which the organic solvent and aqueous hypochlorous acid solution are introduced, an outlet pipe in the bottom for withdrawing these liquids and an inlet close to the bottom for introducing the gas. A gas outlet pipe is provided close to the top so that the ascending gas is thoroughly scrubbed by the descending liquids, according to well known principles. In order to secure good contact between the gas and liquids the tower is partly filled with solid material for breaking up the liquid, exposing a maximum of liquid surface to the gas and retarding the downward flow of the liquids, as is customary in gas scrubbing operations. All the inlet and outlet pipes are fitted with valves so that pressure can be maintained within the apparatus and the flow of liquids and gas properly regulated.

The organic solvent and aqueous hypochlorous acid solution are pumped simultaneously into the top of the reaction vessel and withdrawn from the bottom at a rate sufficient to prevent the apparatus filling with liquid. After the liquids have been withdrawn from the apparatus they are permitted to separate quietly in a suitable storage tank, preferably made of wood or iron. The solvent layer is separated from the aqueous layer and subsequently treated according to whether or not it is desired to isolate the chlorhydrins. If so desired they may be isolated by fractional distillation, the fraction boiling from 125° to 135° C. containing most of the chlorhydrins. Also the aqueous solution which contains some chlorhydrins may be treated directly without actually isolating the chlorhydrins, for example heating with bicarbonate of soda to form glycol or with a secondary amine to form hydroxy alkylamines, or the aqueous solution may be distilled. In the latter case most of the chlorhydrins present will distill with the first fractions. Thus I find that on distilling a five per cent aqueous solution of chlorhydrin the first third of the distillate contains about twelve per cent chlorhydrin although this will vary considerably according to the type of distilling apparatus employed.

The following example illustrates a typical result. Gas resulting from the distillation of petroleum under pressure and containing about twelve per cent of olefines, is compressed to a pressure of 125 pounds per square inch. The gas is then passed into a steel scrubbing tower, in which a pressure of about 125 pounds is also maintained. Using kerosene as the organic solvent and an aqueous hypochlorous acid solution at about 15° C. there results about 21 pounds of chlorhydrin from 1000 cubic feet of the gas.

As a solvent I prefer particularly a light petroleum hydrocarbon fraction having a boiling point range of substantially 150°–180° C. This solvent is not miscible with water, is practically inert to aqueous solutions of hypochlorous acid and possesses relatively great solvent power for the gaseous olefines. Its boiling point is sufficiently high that under a pressure of about 100 lbs. very little solvent is lost by volatilization. Solvents of lower boiling point for example gasoline, benzol, toluol, solvent naptha, carbon tetrachloride, hexachlorethane and the like may be employed but their losses by volatilization are greater than in the case of the hydrocarbon fraction recommended above. Less volatile oils or solvents may be employed, such as kerosene or light lubricating oil, in which case it is advantageous to remove the chlorhydrins from them by distilling in a current of steam.

I find that the gaseous olefines are sufficiently soluble in the solvents mentioned above, particularly under moderate pressures, to operate successfully as in the following example. A gas containing about ten per cent of olefines, is subjected to a pressure of about 150 lbs. per square inch, and then passed through a scrubbing tower, under about 140 lbs. pressure, where it is brought into intimate contact with kerosene. The kerosene which collects at the bottom of the tower is drawn off through a valve and more untreated gas is continually supplied to the scrubber as the washed gas is released, the pressure being maintained practically constant. I prefer pressures within the range 125 to 175 lbs. per square inch although pressures somewhat less or greater than this may be employed. The solvent, which is thus saturated with olefines from the gas, is then passed into a second reaction tower capable of being entirely closed and withstanding moderate pressures. Here the solvent is intimately mixed, by vigorous agitation, with an aqueous solution of hypochlorous acid. When the conversion of the olefines to chlorhydrins is substantially complete, the mixing or agitation is stopped, the liquids separated and treated as described in the first case.

What I claim is:—

1. In the manufacture of chlorhydrins from gases of cracked petroleum containing not substantially over 12% of olefines, the step which comprises bringing the gases under pressure into contact with oil in the presence of hypochlorous material.

2. In the manufacture of chlorhydrins from gases from the petroleum cracking operation containing not substantially over 12% of olefines, the step which comprises bringing the said gases under pressure into contact with a hydrocarbon distillate not miscible with water boiling between about 100°C and about 180°C., in the presence of an aqueous liquid containing hypochlorous acid.

3. In the manufacture of chlorhydrins from still gases of petroleum distillation, containing about 10 to 12% of olefines, the step which comprises bringing said gases under pressure into contact with an oil in the presence of an aqueous liquid containing hypochlorous acid.

BENJAMIN T. BROOKS.